United States Patent
Ashani

(10) Patent No.: US 11,455,785 B2
(45) Date of Patent: Sep. 27, 2022

(54) SYSTEM AND METHOD FOR USE IN OBJECT DETECTION FROM VIDEO STREAM

(71) Applicant: AGENT VIDEO INTELLIGENCE LTD., Rosh HaAyin (IL)

(72) Inventor: Zvika Ashani, Ganey Tikva (IL)

(73) Assignee: AGENT VIDEO INTELLIGENCE LTD., Rosh Haayin (IL)

(*) Notice: Subject to any disclaimer, the term of this patent is extended or adjusted under 35 U.S.C. 154(b) by 0 days.

(21) Appl. No.: 17/257,802

(22) PCT Filed: Jul. 3, 2019

(86) PCT No.: PCT/IL2019/050736
§ 371 (c)(1),
(2) Date: Jan. 4, 2021

(87) PCT Pub. No.: WO2020/008459
PCT Pub. Date: Jan. 9, 2020

(65) Prior Publication Data
US 2021/0124968 A1    Apr. 29, 2021

(30) Foreign Application Priority Data
Jul. 5, 2018 (IL) .......................... 260438

(51) Int. Cl.
*G06V 10/20* (2022.01)
*G06T 7/194* (2017.01)
(Continued)

(52) U.S. Cl.
CPC .......... *G06V 10/255* (2022.01); *G06K 9/622* (2013.01); *G06K 9/6261* (2013.01); *G06T 7/194* (2017.01);
(Continued)

(58) Field of Classification Search
None
See application file for complete search history.

(56) References Cited

U.S. PATENT DOCUMENTS

2009/0087085 A1    4/2009    Eaton et al.
2009/0110240 A1    4/2009    Verdant
(Continued)

OTHER PUBLICATIONS

Lu, et al., Efficient Object Detection for High Resolution Images, arxiv.org/abs/1510.01257, Oct. 5, 2015, pp. 1-8.

*Primary Examiner* — Delomia L Gilliard
(74) *Attorney, Agent, or Firm* — Browdy and Neimark, PLLC

(57) ABSTRACT

A method for use in processing of image data stream is described. The method comprising: providing input data comprising at least one sequence of image data pieces indicative of a region of interest. Processing one or more image frames for detection of one or more foreground pixels regions. Collecting adjacent foreground pixels and determining one or more blobs associated with one or more suspected foreground objects in the region of interest Selecting one or more blobs and generating image portion indicative of one or more suspected foreground objects. And processing said one or more image portions for detection of one or more foreground objects and corresponding one or more object classes. For generating output data comprising class probability for one or more objects detected in one or more frame images of said image data stream.

12 Claims, 6 Drawing Sheets

(51) Int. Cl.
  *G06T 7/70*    (2017.01)
  *G06K 9/62*    (2022.01)
  *G06V 20/40*   (2022.01)

(52) U.S. Cl.
  CPC ............... *G06T 7/70* (2017.01); *G06V 20/41* (2022.01); *G06V 20/46* (2022.01); *G06T 2207/10016* (2013.01); *G06T 2207/20084* (2013.01); *G06T 2207/20132* (2013.01); *G06T 2207/30236* (2013.01)

(56) References Cited

U.S. PATENT DOCUMENTS

| | | | |
|---|---|---|---|
| 2011/0080490 A1* | 4/2011 | Clarkson | G06T 7/70 348/370 |
| 2011/0274315 A1 | 11/2011 | Fan et al. | |
| 2014/0198257 A1 | 7/2014 | Gagvani et al. | |
| 2016/0005182 A1* | 1/2016 | Ashani | G06T 7/44 382/173 |
| 2016/0092736 A1* | 3/2016 | Mai | G06V 40/10 382/103 |
| 2017/0118540 A1* | 4/2017 | Thomas | H04N 21/440263 |

\* cited by examiner

SYSTEM AND METHOD FOR USE IN OBJECT DETECTION FROM VIDEO STREAM

TECHNOLOGICAL FIELD

The present invention relates to object detection in input image data and is particularly relevant for object detection in high resolution video data.

BACKGROUND

Video analytics relate to processing techniques enabling automatic analysis of video data for desired information. An important role of video analytics relates to classification of events or objects in the video data and detection of object or events based on one or more selected interest parameters.

Video analytics techniques may be used for analyzing costumer activity in retail stores, leading to better understanding of product arrangement. Additional applications of video analytics may be associated with security cameras, traffic control, retail management, and other applications in which data about behavior of people or objects is needed.

There are various techniques for detection and classification of objects in image data. Such techniques utilize selected computing algorithms and topologies for identifying objects within one or more images and operate to classify the detected objects up to certain probability. Recently developed deep learning techniques and deep convolutional networks allow great advances in object detection applications. These techniques utilize trained neural network for differentiating objects from an image and for determining class probability to the detected objects.

GENERAL DESCRIPTION

Some of the biggest challenges in video processing and analysis relates to computation efficiency. With improvement of video quality, between higher frame rates and resolutions, the need to provide almost real-time processing becomes more demanding. Video data having resolution of 4K is a standard nowadays, and higher image resolutions including 8K and more are becoming regular formats. This requires greater processing power for object detection as the required number of processing cycles increase almost linearly with the number of pixels in the image.

The present invention utilizes a novel technique enabling efficient object detection in image data streams, and especially in video data. The technique of the invention utilizes detection of foreground pixels in different frames of the image data stream and determines selected image portions in which there is increase probability to appearance of relevant objects. This enables performing object detection on the selected image portions to detect various objects in each of the processed image frame and provide object class probability data. This reduces the area of image processed for object detection, enabling to accelerate processing for given image resolution of input data.

More specifically, the present technique operates for processing input data, generally in the form of at least one sequence of image frames (e.g. forming video data, also referred herein as image data piece), where each sequence of image frames is indicative of a selected scene (region of interest). To provide object detection, the present technique may operate for processing at least some of the image data pieces (image frames), for example the technique may apply processing to all frames, or to frames with selected time differences between them (e.g. processing to two frames in a second). The processing comprises detection of one or more foreground pixel regions, collection of the pixel regions to form one or more blobs associated with suspected objects in the corresponding frames. Further, one or more blobs are selected and the technique generates corresponding one or more image portions, being cropped regions of the frame containing the selected blobs. This provides one or more image portions, smaller than the frames of the input data, on which object detection processing is applied. Accordingly, the technique may thus identify one or more objects in the image and provide class probability for the detected objects. The output data may be generated in the form of marking layer on the corresponding image(s) indicating the objects detected with text indicating class probability.

It should be noted that object detection processing may generally include greater processing complexity, as compared to simple tasks such as foreground extraction. More specifically, in some embodiments, foreground extraction may be simply performed by subtraction of two consecutive images one from the other and mark pixels where the difference exceeds a selected threshold as foreground pixels. This is while object detection processing is typically more complex (up to several orders of magnitude) and requires higher processing power (such as processing cycles). Thus, the technique enables reduction of the amount of data in processing utilizing initial detection of image region where relevant object might appear to reduce the amount of pixel regions for the more complex object detection processing tasks.

Thus, according to a broad aspect, the present invention provides a method for use in processing of image data stream, the method comprising: providing input data comprising at least one sequence of image data pieces indicative of a region of interest; processing one or more image frames for detection of one or more foreground pixels regions; collecting adjacent foreground pixels and determining one or more blobs associated with one or more suspected foreground objects in the region of interest; selecting one or more blobs and generating image portion indicative of one or more suspected foreground objects, and processing said one or more image portions for detection of one or more foreground objects and corresponding one or more object classes; and generating output data comprising class probability for one or more objects detected in one or more frame images of said image data stream.

According to some embodiments, selecting one or more blobs may comprise collecting data about the one or more blobs and clustering adjacent blobs forming corresponding image portions comprising clusters of said blobs. Clustering adjacent blobs may be used to reduce that a number of image portions covering together all of the foreground pixel region does not exceed a predetermined image regions threshold.

According to some embodiments, said processing said one or more image portions for detection of object class may comprise utilizing one or more object detection techniques, capable of detection of objects in image portion, for providing object location and classification data for the one or more detected objects. The method may further comprise utilizing a neural network processing topology for detection of objects in image portion for providing object classification data for the one or more detected objects.

According to some embodiments, said image data stream comprises one or more sequences of consecutive video of a region of interest having predetermined field of view of the region of interest.

According to some embodiments, said detection of one or more foreground pixels regions comprises processing at least two consecutive image frames for determining pixels variations between the consecutive image frames.

According to some embodiments, said detection of one or more foreground pixels regions comprises determining a relation between a selected image frame and background models determined in accordance with one or more previous frames.

According to one other broad aspect, the present invention provides a software product, embedded on a computer readable medium comprising computer readable code that when executed by one or more processors, cause the processor to process input data to thereby: receive input data comprising at least one sequence of consecutive image frames piece of a region of interest; process one or more image frames for detection of one or more foreground pixels regions; collect adjacent foreground pixels and determining one or more blobs associated with one or more suspected foreground objects in the region of interest; select one or more blobs and generate image portion indicative of one or more suspected foreground objects, and process said one or more image portions for detection of one or more foreground objects and corresponding one or more object classes; and generate output data comprising class probability for one or more objects detected in one or more frame images of said image data stream.

According to yet another broad aspect, the present invention provides a system for use if object detection, the system comprising communication module, storage unit and processing utility and configured for processing input data comprising image data stream comprising at least one sequence of consecutive image frames; said processing utility comprises at least one processor comprising: foreground extraction module configured for receiving one or more frames of the image data stream and for determining one or more foreground pixels regions; blob generation module configured for receiving data on the foreground pixels regions and for collecting adjacent foreground pixels and determining one or more blobs associated with one or more suspected foreground objects; image cropping module configured for selecting one or more blobs and generating image portion indicative of one or more suspected foreground objects; and object detection module configured for receiving one or more image portions and for processing the one or more image portions for detection objects in said image portions and determining corresponding object data comprising location and classification of one or more detected objects; said at least one processor thereby generates output data comprising class probability for one or more objects detected in one or more frame images of said image data stream.

According to some embodiments, the image cropping module may be configured for collecting data about the one or more blobs and clustering adjacent blobs forming corresponding image portions comprising clusters of said blobs.

According to some embodiments, the image cropping module may be configured for clustering adjacent blobs to provide that a number of image portions covering together all of the foreground pixel region does not exceed a predetermined image regions threshold.

According to some embodiments, the object detection module may comprise one or more neural network modules configured for utilizing one or more object detection techniques capable of detection of objects in image portion for providing object classification data for one or more detected objects.

According to some embodiments, the image data stream may comprise one or more sequences of consecutive video of a region of interest having predetermined field of view of the region of interest.

According to some embodiments, the foreground extraction module may be configured for processing at least two consecutive image frames for determining pixels variations between the consecutive image frames.

According to some embodiments, the foreground extraction module may be configured for processing one or more image frames for determining pixels variations between the said one or more image frames and background model data stored in said storage unit.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

According to yet another broad aspect, the present invention provides a program storage device readable by machine, embodying a program of instructions executable by the machine to perform a method for use in processing of image data stream, the method comprising:
  providing input data comprising at least one sequence of image data pieces indicative of a region of interest;
  processing one or more image frames for detection of one or more foreground pixels regions;
  collecting adjacent foreground pixels and determining one or more blobs associated with one or more suspected foreground objects in the region of interest;
  selecting one or more blobs and generating image portion indicative of one or more suspected foreground objects, and processing said one or more image portions for detection of one or more foreground objects and corresponding one or more object classes; and
  generating output data comprising class probability for one or more objects detected in one or more frame images of said image data stream.

According to an additional embodiments, the present invention provides a computer program product comprising a computer useable medium having computer readable program code embodied therein for use in processing of image data stream, the computer program product comprising:
  computer readable program code for causing the computer to provide input data comprising at least one sequence of image data pieces indicative of a region of interest;
  computer readable program code for causing the computer to process one or more image frames for detection of one or more foreground pixels regions;
  computer readable program code for causing the computer to collect adjacent foreground pixels and determining one or more blobs associated with one or more suspected foreground objects in the region of interest;
  computer readable program code for causing the computer to select one or more blobs and generating image portion indicative of one or more suspected foreground objects, and processing said one or more image portions for detection of one or more foreground objects and corresponding one or more object classes; and
  computer readable program code for causing the computer to generate output data comprising class probability for one or more objects detected in one or more frame images of said image data stream.

It should be noted that the program code and computer readable instructions indicated above may implement selected one or more operations associated with the method for use in processing of image data stream as indicated above and through the present document in its entirety.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 5A shows image portions for the detected blobs above selected threshold and FIG. 5B shows image portions after collection of blobs for simplifying processing according to some embodiments of the invention;

DETAILED DESCRIPTION OF EMBODIMENTS

The present invention provides a novel technique enabling object detection in image data stream, e.g. video data, with reduced computation complexity. This enables real-time or almost real-time object detection on high resolution video data, providing highly valuable information on location of various objects and classification thereof.

Figure 1:
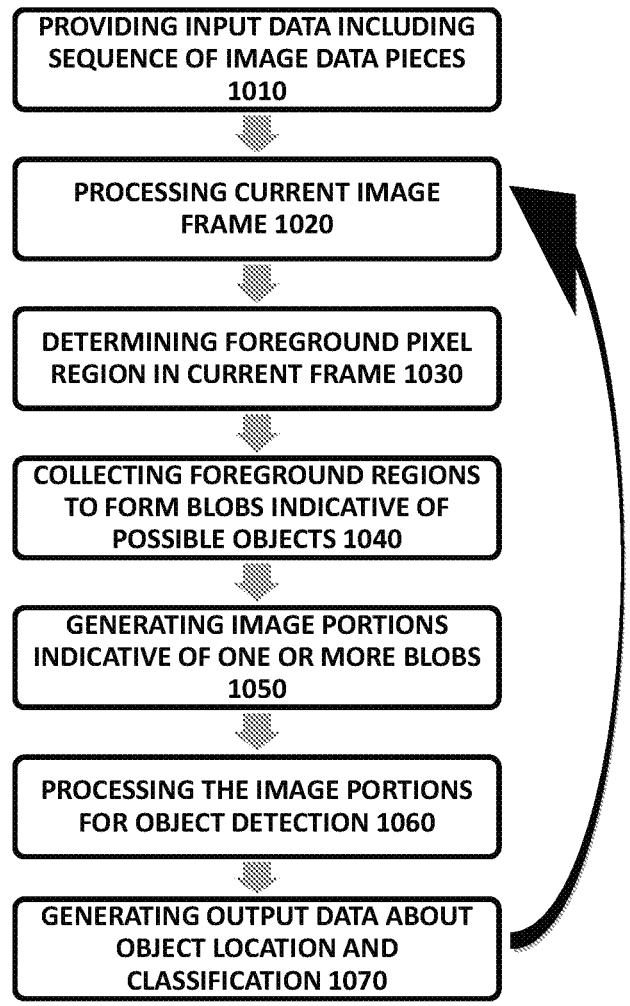
FIG. 1 illustrates processing of image data pieces for object detection according to some embodiments of the invention.

Reference is made to FIG. 1 showing a flow diagram illustrating the present technique for object detection in input image data stream. As shown, the present technique includes providing or receiving input data in the form of one or more sequences of image data pieces (e.g. video input) 1010. Generally, when operated in real time (or almost real time), each image data piece indicative of a frame 1020 of captured data may be received at a corresponding time, while the technique is operated for processing of the frame, additional frame is captured by a camera to form the video. When processing an image frame, the present technique utilizes initial foreground extraction 1030 within the frame. More specifically, the foreground extraction may utilize comparison of the current frame with previous frame or to a separately generated background frame, stored in an accessible storage utility, to determine pixel regions showing shift of objects. It should be noted that the foreground extraction may be determined utilizing reduced resolution of the image, i.e. for purposes of foreground extraction, one out of every 4, 9, 16 or 25 pixels may be used, under the assumption that object movements typically involve more than a single pixel in the image. Nearby foreground pixels are collected for forming blobs 1040 associated with possible objects in the frame. These blobs represent regions of the frame where relevant objects might appear and accordingly where the object detection processing should preferably concentrate.

Generally, blobs may be detected based on collection of any number of foreground pixels. However depending on scene size and field of view, smaller blobs may be associated with various movements that do not relate to relevant objects, such as leaves or branches movement etc. Accordingly, blobs associated with size smaller than a selected threshold may be removed from further processing and marked as environmental noise. It should be noted that the environmental noise data may be stored for completeness and analysis if needed.

For processing of possible objects based on the detected foreground blobs, the technique utilizes cropping 1050 of the image frame to one or more image portions, each surrounding one or more blobs of possible objects. Generally, the technique may allow a selected number of image portions as described further below. Thus if the number of blobs is greater than the selected number of image portions, nearby blobs may be collected together to form an image portion associated with two or more possible objects. At this stage, the object detection processing technique is operated 1060 on the different image portions for determining existence, location and class of the possible objects therein. Further, suitable output data is provided 1070, e.g. in the form of bounding boxes for detected objects including probably class and additional data if needed.

Figure 2:
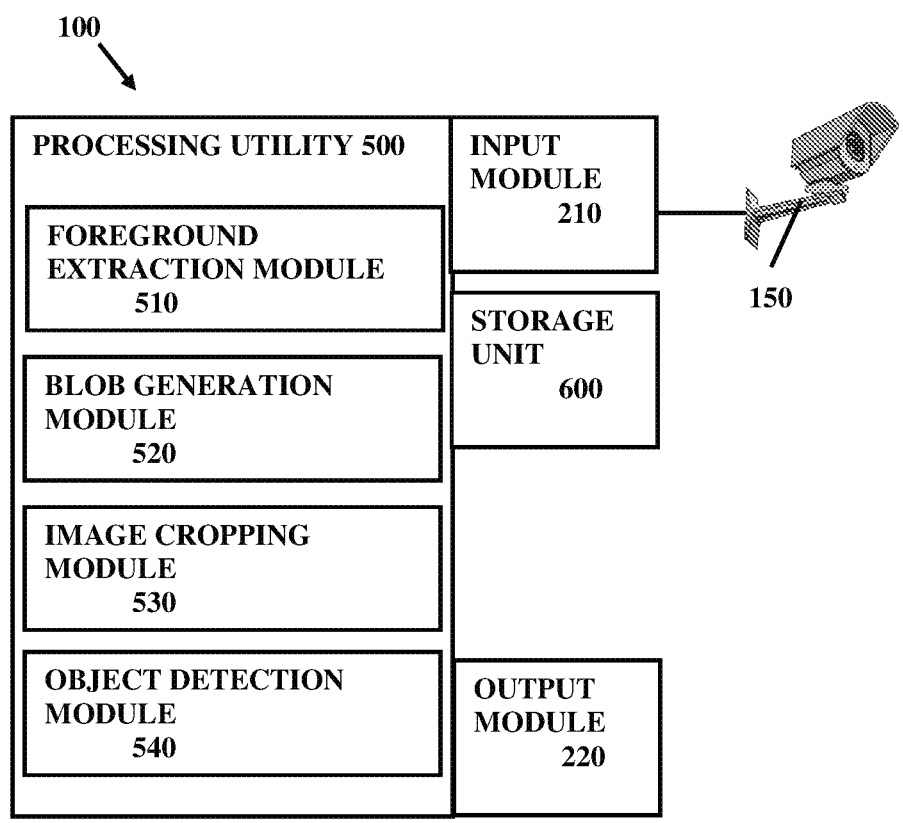
FIG. 2 schematically illustrates a system for object detection according to some embodiments of the invention.

In this connection the technique of the present invention may be operated using a computer system having at least one processor, storage/memory utility and input/output modules. The computer system may be responsive to input image data pieces, transmitted by one or more camera units and indicative of a region of interest. Reference is made to FIG. 2 schematically illustrating a system 100 according to some embodiments of the present invention. System 100 includes a processing utility 500, e.g. including one or more processors, storage unit 600 and input and output communication modules 210 and 220 respectively. The system 100 is connectable to one or more camera units 150 providing image stream (e.g. video data) of selected one or more regions of interest. Generally the system 100 may be configured for processing image data stream in real time or almost real time, i.e. with a slight delay of less than 2 seconds, or operate for processing stored image data stream.

The processing utility 500 may typically include several software or hardware modules configured to performing corresponding processing tasks of the present technique. More specifically, the processing utility 500 may include foreground extraction module 510, blob generation module 520, image cropping module 530 and object detection module 540. The processing utility 500 may also include one or more additional modules configured for intermediate processing tasks as the case may be.

Typically, the system 100 may receive collected image data frame by frame for real-time processing. Accordingly, upon receiving an input image data, i.e. a captured frame, the foreground extraction module 510 is configured for determining one or more foreground pixel regions within the frame. The foreground extraction module may retrieve previous frame or selected background frame/model stored in the storage unit 600 for determining pixel regions showing variation between the different frames. More specifically, by determining a difference between consecutive frames, pixel regions associated with objects that move between the frames provide non-zero difference enabling the foreground extraction module 510 to determine binary foreground pixel map based on pixels that show difference greater than a selected threshold between the different frames. Such foreground pixel map provides indication to possible objects that are moving in the region or interest, and which should preferably be detected using object detection techniques, to be properly identified and classified.

It should be noted that such foreground extraction technique generally identifies regions associated with objects that are moving between the relevant frames, and may ignore regions associated with objects that are currently stationary such as cars standing in traffic lights. However, such stationary objects arrived to the current location at an earlier time and have thus been detected at that time. As described further below, the present technique may utilize storing data on detected objects in the storage unit 600 and maintaining object classification on the object and corresponding image region if the object does not move, while not needing additional processing.

The foreground extraction module 510 is configured to send data on detected foreground pixel regions to the blob generation module 520. The blob generation module 520 may operate for collecting adjacent foreground pixels for generating blobs of foreground pixels. Generally such blobs are used as indication of possible objects in the image data, as being formed of collection of foreground pixels. The blob generation module 520 may remove or ignore blobs that are smaller than a predetermined threshold, which may be selected in accordance with size of various objects as appearing in the image data. Additionally or alternatively, the blob generation module 520 may collect together clusters of foreground pixels forming clusters of blobs associated with two or more possible objects. This may be used for maintaining total number of blobs, as an alternative to collection of blobs for image cropping as described herein below, or in configuration that require high sensitivity and may suffer from high foreground noise. The blob generation module further sends data on the detected blobs to the image cropping module 530 for generating corresponding image portions.

The image cropping module 530 operates for generating one or more image portions associated with the one or more blobs detected by the blob generation module 520. The image portions are generally cropped regions of the frame that is in processing, providing image data of one or more possible objects to be detected. Typically, the image cropping module is configured for generating a number of image portions that does not exceed a predetermined threshold, e.g. up to 10 or up to 7 or up to 5 image portions. This may be associated with operation of the blob generation module 520 for clustering together blobs for maintaining total number of blobs. Thus, in some configurations the image cropping module 530 may collect nearby blobs to form corresponding common image portion, or generate image portion associated with cluster of blobs collected by the blob generation module 520.

More specifically, if the number of blobs is greater than the threshold for image portions, the blob generation module 520, the image cropping module 530 or both, may collect two or more blobs that are relatively close within the frame into a common blob cluster within a common image portion. Such image portion effectively represents two or more blobs associated with possible objects.

To this end, the object detection module 540 is configured for receiving one or more image portions for object detection processing. The object detection module 540 may include one or more neural network processing modules, or other processing architectures capable of processing image data for object detection and classification as known in the art.

Generally, for a typical scene taken from a region of interest, the total number of pixels of the image portions may take between 1% to 50% of the total number of pixels in the image frame. In some cases, where the region of interest relates to large amount of moving objects, such as busy street, traffic jam etc., the total area of the image portions might exceed 50% of the frame. Accordingly, the processing utility may occasionally determine area ratio of image portions marked. If the area ratio is determined as exceeding a predetermined ratio for simplified computing, the processing utility may skip foreground extraction, blob generation and image cropping, and direct the entire frame to undergo object detection processing, typically with reduced resolution to simplify processing.

Additionally, short term foreground extraction, i.e. determining foreground pixel regions based on variations between two or more consecutive image frames, may result in ignoring still objects. For example a vehicle standing in red light might not move for about a minute or more. Within this time, the vehicle will not be further processed as foreground object. However, when an object moving in the region of interest is detected and classified, this data may be maintained for the location of the object in case there is no movement for certain time period. Thus, if a vehicle that was detected and classified stops moving, the output representation data of the system may still mark its last location by the object classification, without additional processing. This is based on the assumption that an object that does not move is stationary and its classification and location do not change.

Figure 3:
FIG. 3 shows a frame taken a selected scene and used for exemplifying the technique according to some embodiments of the present invention.
Figure 4:
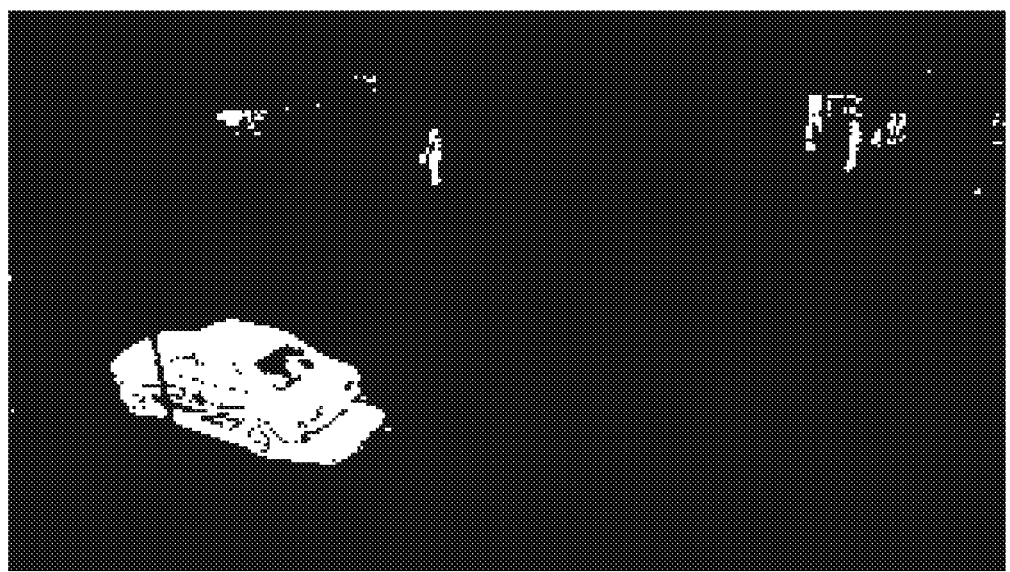
FIG. 4 shows foreground pixel map determined based on the image shown in FIG. 3 and a corresponding background model.

Reference is made to FIGS. 3 to 7 showing images associated with selected intermediate processing actions according to some embodiments of the present invention. FIG. 3 shows an image frame taken from a region of interest. For simplicity of image processing, the present technique may generally utilize image data in black and white colors, however colored image processing may also be used (though might be more computationally heavy). FIG. 4 shows foreground pixel map determined in accordance with difference between the present frame, shown in FIG. 3, and a background model (background frame) generated based on previous frames. Thus, only pixel regions associated with movement in the frame are marked as foreground pixels. In this map foreground pixels are marked in white over dark background. FIGS. 5A and 5B show image regions associated with main blobs determined from the foreground map. FIG. 5A shows the determined image portions, and FIG. 5B shows collected image portions selected by collecting nearby blobs into a common image portion. FIGS. 6A to 6E show cropped image portions associated with possible objects to be detected, and FIG. 7 exemplifies output image with overlaid object classification data. The present technique utilizes object detection processing applied on the different image portions exemplified in FIGS. 6A to 6E, to provide the output data indicative of location and classification of objects detected in these image portions. After detecting the different objects, the relevant object labels may be converted to indicate location with respect to the complete frame and to provide output indication as exemplified in FIG. 7.

Figure 5A:
FIGS. 5A and 5B exemplify image portions associated with detected blobs in image data.

In FIG. 5A, adjacent foreground pixels are grouped together to form blobs associated with possible objects. Generally, the present technique may utilize removing of blobs smaller than a predetermined threshold (determined in accordance with detection requirements and frame dimensions). To further optimize processing, the present technique may collect nearby blobs as exemplified in FIG. 5B, where the two marked blobs on the top right corner of FIG. 5A are collected to a common image portion in FIG. 5B. This collection is provided to limit the number of image portions for processing.

Figure 5B:
Figure 6A:
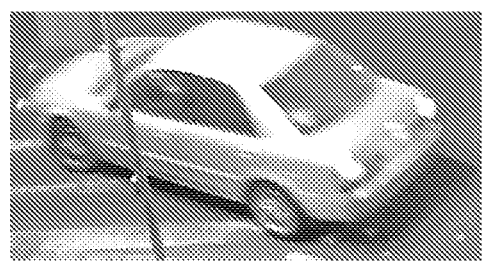
FIGS. 6A to 6E show image portions of suspected objects as shown in FIG. 5B.
Figure 6B:
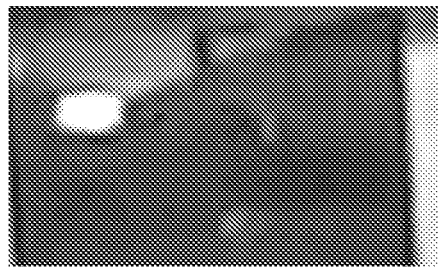
Figure 6C:
Figure 6D:
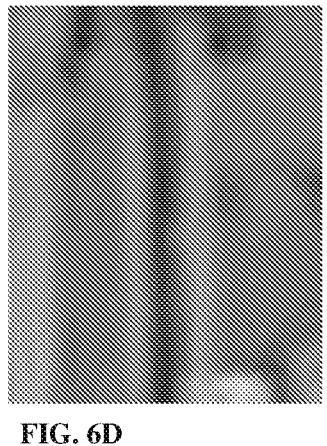
Figure 6E:

The image portions marked in FIG. 5B are selected for further processing utilizing one or more object detection processing techniques. FIGS. 6A to 6E show the selected image portions, where each image portion includes one or more possible objects determined in accordance with the detected foreground blobs. Typically, the object detection processing may use any know suitable technique including, for example, suitably trained neural network topology or any other technique. In this example object detection utilizes SSD network architecture trained for detection and classification of objects (persons, vehicles) within images with a resolution of 64×64 pixels. By processing only selected image portions, generally taking between 1% and 50% of the frame area, the present technique enables to simplify the object detection processing and to provide high speed object detection even for high resolution images. As mentioned above, objects that are not moving between two or more frames may not be detected in foreground extraction and thus do not require additional processing (while the object label may still be shown in output data).

More specifically, in the present example, the total number of pixels processed for object detection is 5×64×64=20480, i.e. five image portions at resolution of 64×64 each. A conventional object detection processing on the entire image data requires processing of e.g. 1280×720=921600 pixels for the case of 1280×720 resolution, or higher number in higher resolution. Thus, the present technique may provide about ×45 improvement in processing speed, generally the present technique enables processing of between 1% and 50% of the total number of pixels. Indeed the present technique requires additional processing actions such as foreground extraction and blob collection, however these processing actions are relatively simple. Generally the present technique may improve object detection speed by a factor of between 10 and 20 in processing speed.

Figure 7:
FIG. 7 exemplifies output image data including image of the scene and additional data layers indicative of detected and classified objects.

An exemplary output frame is shown in FIG. 7, showing the original input image data with additional information layer marking the detected objects and providing data on corresponding classification. In this example, the detection processing identified 3 persons, with classification probabilities of 74%, 82% and 84%, and one vehicle with classification probability of 99%. Additional vehicles seen to human eye in the frame are not marked since these vehicles did not move between the previous and present frame and thus are not marked as foreground data in this processing stage. As indicated, these objects may be marked in view of detection in previous frames, up to a selected time limit in which the stationary object may not be marked until it moves again.

It should be noted, and is described herein, that the present technique provides pre-processing of collected frames for detection of possible objects and utilizes object detection technique for detection and classification only of the possible objects. This enables reduction of the total number of pixels that are being processed for object detection enabling real-time processing of high resolution video data, with reduced processing complexity.

The invention claimed is:

1. A method for use in processing of image data stream, the method comprising:
providing input data comprising at least one sequence of image data pieces indicative of a region of interest;
processing one or more image frames for detection of one or more foreground pixels regions;
collecting adjacent foreground pixels and determining one or more blobs associated with one or more suspected foreground objects in the region of interest;
clustering adjacent blobs forming corresponding image portions comprising clusters of said blobs;
selecting one or more blobs and generating image portion indicative of one or more suspected foreground objects, and processing said one or more image portions for detection of one or more foreground objects and corresponding one or more object classes; and
generating output data comprising class probability for one or more objects detected in one or more frame images of said image data stream;
wherein a number of image portions covering together all of the foreground pixel region does not exceed a predetermined image regions threshold to thereby enable object detection with reduced computation complexity.

2. The method of claim 1, wherein said processing said one or more image portions for detection of object class comprises utilizing one or more object detection techniques, capable of detection of objects in image portion, for providing object location and classification data for the one or more detected objects.

3. The method of claim 2, further comprising utilizing a neural network processing topology for detection of objects in image portion for providing object classification data for the one or more detected objects.

4. The method of claim 1, wherein said image data stream comprises one or more sequences of consecutive video of a region of interest having predetermined field of view of the region of interest.

5. The method of claim 1, wherein said detection of one or more foreground pixels regions comprises processing at least two consecutive image frames for determining pixels variations between the consecutive image frames.

6. The method of claim 1, wherein said detection of one or more foreground pixels regions comprises determining a relation between a selected image frame and background models determined in accordance with one or more previous frames.

7. A software product, embedded on a non-transitory computer readable medium comprising computer readable code that when executed by one or more processors, cause the processor to process input data to thereby:
receive input data comprising at least one sequence of consecutive image frames piece of a region of interest;
process one or more image frames for detection of one or more foreground pixels regions;
collect adjacent foreground pixels and determining one or more blobs associated with one or more suspected foreground objects in the region of interest;
cluster adjacent blobs forming corresponding image portions comprising clusters of said blobs;
select one or more cluster of blobs and generate image portion indicative of one or more suspected foreground objects, and process said one or more image portions for detection of one or more foreground objects and corresponding one or more object classes; and
generate output data comprising class probability for one or more objects detected in one or more frame images of said image data stream;

wherein a number of image portions covering together all of the foreground pixel regions does not exceed a predetermined image regions threshold to thereby enable object detection with reduced computation complexity.

8. A system for use if object detection, the system comprising communication module, storage unit and processing utility and configured for processing input data comprising image data stream comprising at least one sequence of consecutive image frames; said processing utility comprises at least one processor adapted for:

receiving one or more frames of the image data stream and processing the one or more frames to determine one or more foreground pixels regions;

processing the one or more foreground pixels regions for collecting adjacent foreground pixels and determining one or more blobs associated with one or more suspected foreground objects;

collecting data about the one or more blobs, clustering adjacent blobs to form corresponding image portions comprising clusters of said blobs and selecting one or more clusters of blobs and generating image portion indicative of one or more suspected foreground objects; and processing the one or more image portions for detecting objects in said image portions and determining corresponding object data comprising location and classification of one or more detected objects;

said at least one processor thereby generates output data comprising class probability for one or more objects detected in one or more frame images of said image data stream;

wherein said clustering adjacent blobs comprises determining a total number of image portions covering together all of the foreground pixel region, said total number does not exceed a predetermined image regions threshold.

9. The system of claim 8, wherein said detecting objects in said image portions comprises operating one or more neural network configured for utilizing one or more object detection techniques capable of detection of objects in image portion for providing object classification data for one or more detected objects.

10. The system of claim 8, wherein said image data stream comprises one or more sequences of consecutive video of a region of interest having predetermined field of view of the region of interest.

11. The system of claim 8, wherein said determine one or more foreground pixels regions comprises processing at least two consecutive image frames for determining pixels variations between the consecutive image frames.

12. The system of claim 8, wherein said determine one or more foreground pixels regions comprises is configured for processing one or more image frames for determining pixels variations between the said one or more image frames and background model data stored in said storage unit.

* * * * *

UNITED STATES PATENT AND TRADEMARK OFFICE
CERTIFICATE OF CORRECTION

PATENT NO. : 11,455,785 B2
APPLICATION NO. : 17/257802
DATED : September 27, 2022
INVENTOR(S) : Zvika Ashani Page 1 of 1

It is certified that error appears in the above-identified patent and that said Letters Patent is hereby corrected as shown below:

In the Claims

In Claim 12, Column 12, Line 25, please delete "is configured for".

Signed and Sealed this
Twenty-seventh Day of August, 2024

Katherine Kelly Vidal
*Director of the United States Patent and Trademark Office*